United States Patent
Deshpande et al.

(10) Patent No.: US 9,286,411 B2
(45) Date of Patent: Mar. 15, 2016

(54) RETRIEVAL OF RELEVANT OBJECTS IN A SIMILARITY

(75) Inventors: Prasad M. Deshpande, Mumbai (IN); Raghuram Krishnapuram, New Delhi (IN); Debapriyo Majumdar, Kolkata (IN); Deepak S. Padmanabhan, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 12/491,485

(22) Filed: Jun. 25, 2009

(65) Prior Publication Data

US 2010/0332492 A1    Dec. 30, 2010

(51) Int. Cl.
*G06F 7/00* (2006.01)
*G06F 17/30* (2006.01)
*G06F 17/00* (2006.01)

(52) U.S. Cl.
CPC .... *G06F 17/30979* (2013.01); *G06F 17/30442* (2013.01); *G06F 17/30463* (2013.01); *G06F 17/30477* (2013.01)

(58) Field of Classification Search
CPC ................. G06F 17/30463; G06F 17/30477; G06F 17/30442; G06F 17/30979
USPC ............................ 707/713, 999.001–999.005
See application file for complete search history.

(56) References Cited

U.S. PATENT DOCUMENTS

| | | | |
|---|---|---|---|
| 6,714,929 B1 * | 3/2004 | Micaelian et al. | 707/999.004 |
| 7,299,220 B2 * | 11/2007 | Chaudhuri et al. | 707/999.002 |
| 7,376,643 B2 | 5/2008 | Zeng et al. | |
| 2004/0002973 A1 * | 1/2004 | Chaudhuri et al. | 707/7 |
| 2005/0223026 A1 * | 10/2005 | Chaudhuri et al. | 707/103 R |
| 2006/0206475 A1 * | 9/2006 | Naam et al. | 707/5 |
| 2007/0198439 A1 * | 8/2007 | Shriraghav et al. | 705/400 |
| 2008/0288527 A1 * | 11/2008 | Ames et al. | 707/102 |
| 2008/0306945 A1 * | 12/2008 | Chaudhuri et al. | 707/6 |

OTHER PUBLICATIONS

Yufei et al. Efficient Skyline and Top-K Retrieval in Subspaces, IEEE, Transaction on Knowledge and Data Engeneering, pp. 1-35, 2007.*
Balke, W., Gunzer, U., and Zheng, J. 2004. Efficient distributed skylining for Web information systems. In Proceedings of the International Conference on Extending Database Technology (EDBT; Heraklio, Greece, Mar. 14-18). 256-273.*
Dong Xin , Jiawei Han, P-Cube: Answering Preference Queries in Multi-Dimensional Space, Proceedings of the 2008 IEEE 24th International Conference on Data Engineering, p. 1092-1100, Apr. 7-12, 2008.*
Schumacher et al., An Efficient Approach to Similarity-Based Retrieval on Top of Relational Databases, E. Blanzieri and L. Portinale (Eds.): EWCBR 2000, LNAI 1898, pp. 273-285, 2000.

(Continued)

*Primary Examiner* — Kannan Shanmugasundaram
(74) *Attorney, Agent, or Firm* — Ryan, Mason & Lewis, LLP (57) ABSTRACT

Techniques for retrieval of one or more relevant multi-attribute structured objects with respect to a query are provided. The techniques include receiving a query, grouping one or more attributes of one or more objects in a database into one or more groups according to how each bears a relation to the query, and using the one or more attribute groups to produce an output of one or more relevant multi-attribute structured objects in response to the query.

15 Claims, 8 Drawing Sheets

(56) References Cited

OTHER PUBLICATIONS

Lee et al., Personalized top-k skyline queries in high-dimensional space, Information Systems vol. 34 Issue 1, pp. 45-61, 2009.
Vlachou et al., Skyline-based Peer-to-Peer Top-k Query Processing, pp. 1421-1423, 2008 IEEE.
Hullermeier et al., Supporting Case-Based Retrieval by Similarity Skylines: Basic Concepts and Extensions, http://www.mathematik.uni-marburg.de/~eyke/publications/s11.pdf.
Goncalves et al., Top-k Skyline: A Unified Approach, http://cat.inist.fr/?aModele=afficheN&cpsidt=17344833.

* cited by examiner

RETRIEVAL OF RELEVANT OBJECTS IN A SIMILARITY

FIELD OF THE INVENTION

Embodiments of the invention generally relate to information technology, and, more particularly, to similarity searches.

BACKGROUND OF THE INVENTION

Given a database of objects (with multiple attributes), a query object and information about how the attributes are dependent on each other, or interact with each other, output a set of objects that are most relevant according to the information about the interactions and dependencies.

Consider the example of servers, a specific type of object (s) prevalent in the information technology industry. In general, servers have many attributes, some of which are compensatory and some of which are independent. For example, compensatory attributes can include attributes that influence performance (for example, less cache size can be compensated by faster speeds of processors). Additionally, by way of example, Java capability of a server can be assessed by assessing the maximum capability (for example, Java version) of the various Java related software. Independent attributes can include, for example, central processing unit (CPU) speed and hard disk space.

Retrieval using a skyline operator can include the following. Based on a query object, an object A is dominated by another object B if for every attribute i, $B_i < A_i$ where $B_i$ represents the dissimilarity of B to the query on attribute i. However, the lack of quality in one attribute cannot be compensated by the value of any other attribute. Also, for sparse datasets or for datasets with a large number of attributes, the set of results returned by a skyline query becomes too huge and unusable. Further, skyline assumes fully independent attributes, which is rarely the case. Also, the skyline operator induces a partial order among the objects with respect to the query.

Top-K retrieval using aggregation operators can include the following. Every object has a quality measure, and the aggregate of the similarity to the query object is based on various attributes. Top-K aggregation functions usually return a single quality measure, which induces a total order of objects. Also, a user is required to specify a weight vector in certain cases where aggregation requires a weight vector. However, top-K aggregations assume that every attribute can be influenced by any other attribute, and there exist common real-world scenarios where that is not the case.

As such, existing retrieval systems compose attributes using a single operator. It would be desirable, however, to compose a model for combining attributes using various similarity operators for use in a similarity search.

SUMMARY OF THE INVENTION

Principles and embodiments of the invention provide techniques for retrieval of relevant objects in a similarity search. An exemplary method (which may be computer-implemented) for retrieval of one or more relevant multi-attribute structured objects with respect to a query, according to one aspect of the invention, can include steps of receiving a query, grouping one or more attributes of one or more objects in a database into one or more groups according to how each bears a relation to the query, and using the one or more attribute groups to produce an output of one or more relevant multi-attribute structured objects in response to the query.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Principles of the invention include similarity-based retrieval using aggregation and skyline operators. One or more embodiments of the invention include techniques for retrieval of similar or relevant multi-attribute structured objects in a similarity search of database of objects. The techniques can include, for example, employing a combination of different aggregation operators (such as, for example, "weighted mean," "AND," "OR," etc.) as well skyline operators to cater for both interdependent and independent attributes of objects. Also, one or more embodiments include user input techniques to group attributes according to how they interact as well as specify how the groups should be combined while evaluating similarity.

As detailed herein, one or more embodiments of the invention include allowing a user to specify how different attributes interact (for example, top-k style, skyline style), to group them accordingly and to specify how such groups should be combined. Additionally, the techniques described herein include providing a system capable of taking such inputs from the user and producing a sorted list of (for example, a subset of) objects from the database according to such specifications as noted above.

As noted herein, in real-world scenarios, certain attributes can be interdependent whereas certain others can be independent. Also, different sets of attributes may have to be combined in different ways (using different attributes). A single aggregation operator or a skyline operator would not suffice for aggregating all the attributes. In such scenarios as above, either top-K (one of the aggregation operators that top-k can work with) or skyline alone are inappropriate. As such, one or more embodiments of the invention include using a combination of these and the ability to specify various aggregation functionalities.

Additionally, the techniques described herein can include the use of relational operators for a similarity search. For example, aggregation operators can be used for top-K like queries, and they define a total order of the objects. These compare objects on the basis of an often real-valued dissimilarity measure; that is, an object less dissimilar is preferred over the other. Exemplary aggregations can include the following.

Intersection: $\min\{A_1, A_2, \ldots, A_n\}$;
Union: $\max\{A_1, A_2, \ldots, A_n\}$;
Generalized Mean: $\Sigma_i\, w_i\, A_i$; and
Euclidean Distance: $\sqrt{\Sigma_i (w_i\, A_i)^2}$.

Additionally, as detailed herein, one or more embodiments of the invention include using skyline operators. With respect to skyline operators, $A_i$ is the dissimilarity to the query for object A based on attribute i.

Additionally, one or more embodiments of the invention can include searching for resumes. By way of example and not limitation, assume that a project is in the phase where development and maintenance are involved, and code may be developed either in C++ or Java. The skill set can be determined by taking the best of C++ and Java Experience. Thus, C++ and Java experiences combine using the "OR" operator. Also, candidates with both development and maintenance experience are desirable. Thus, the development and maintenance experiences combine using the "AND" operator.

One may want to prefer candidates whose location is closer to the project location, which is relatively independent of the above attributes. As such, it can combine with the skill set and experience nature attributes using the skyline operator. That is, among two people who have the same skill sets, the candidate staying closer would be preferred.

Figure 1:
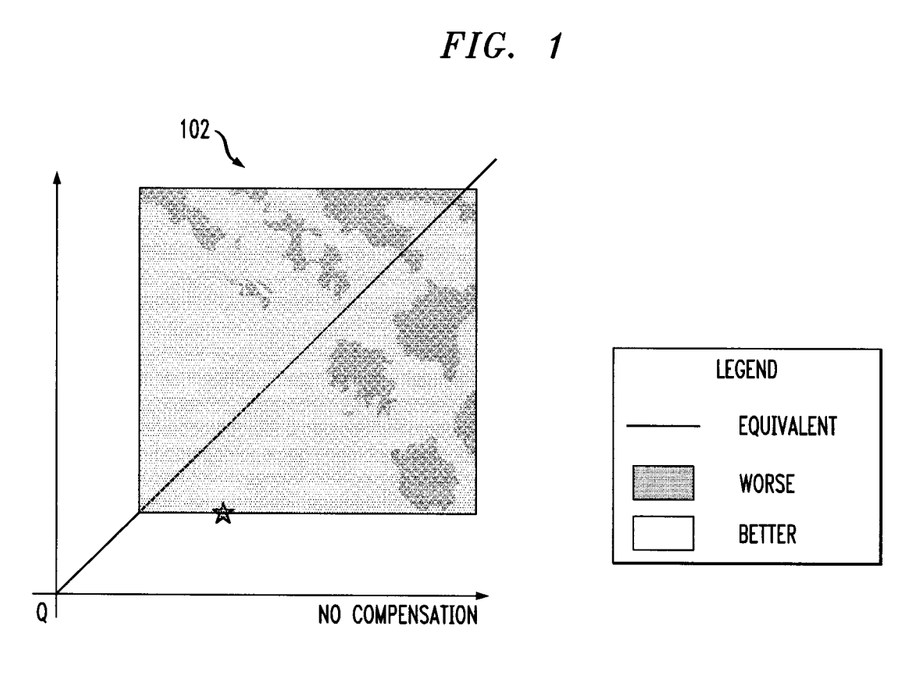
FIG. 1 is a graph illustrating a union operator (UO), according to an embodiment of the present invention.

FIG. 1 is a graph 102 illustrating a union operator (UO), according to an embodiment of the present invention. By way of illustration, in graph 102 of FIG. 1, an object is better than another if the best attribute of the former is better than the best attribute of the latter. In FIG. 1, assuming that better is being closer to the query Q, the star object would be better than (preferred to) objects in the shaded region. (By way of example, $A \succ_{\cap} B$ if $\min(a_i) < \min(b_i)$; distance of object $o = \min (o_i)$, and $A \succ_{\cap} B$ if quality objects are compared on their best attributes.)

Figure 2:
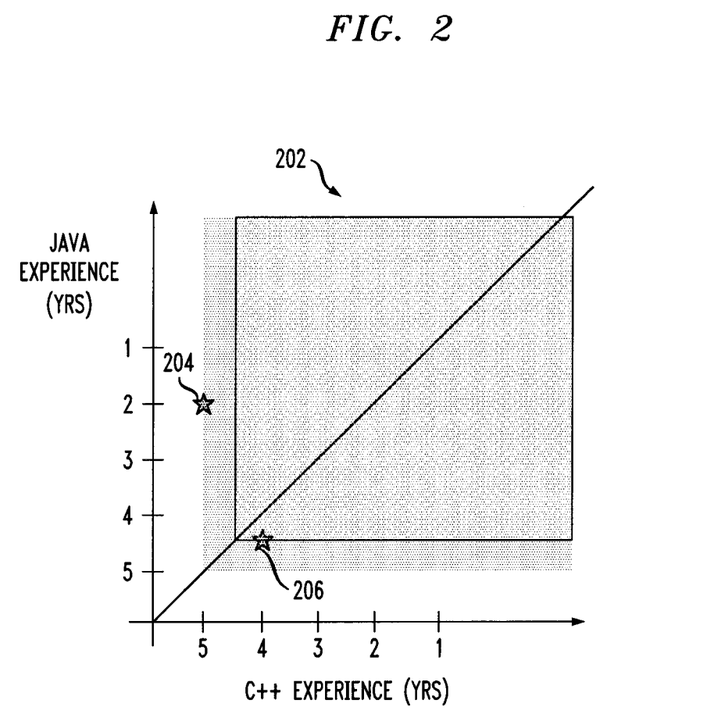
FIG. 2 is a graph illustrating an exemplary usage of a union operator (UO), according to an embodiment of the present invention.

FIG. 2 is a graph 202 illustrating an exemplary usage of a union operator (UO), according to an embodiment of the present invention. In graph 202 of FIG. 2, the query includes a hypothetical person who has maximum experience (10,10). Also, the enterprise case indicates that either C++ or Java experience is sufficient (hence, use the union operator). As depicted in graph 202, option 204 includes data points of 5 and 2 (respectively on the axes), while option 206 includes data points of 4 and 4.5. Further, as indicated in FIG. 2, option 204 is more advantageous than option 206 because its best attribute (that is, 5) is better (higher absolute values are better) than that of 206 (that is, 4.5). It may be noted that this is despite the fact that the average goodness of option 206 (which is 4.25—the average of 4 and 4.5) is better than the average goodness of option 204 (which is 3.5—the average of 2 and 5).

Figure 3:
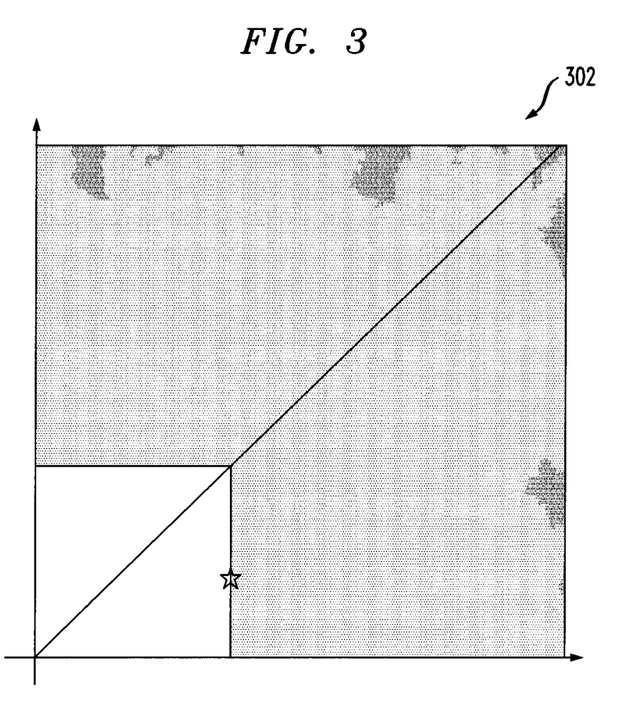
FIG. 3 is a graph illustrating an intersection operator (IO), according to an embodiment of the present invention.

FIG. 3 is a graph 302 illustrating an intersection operator (IO), according to an embodiment of the present invention. Graph 302 in FIG. 3 illustrates the intersection operator. This operator considers an object better than another object if the worst attribute of the former is better than the worst attribute of the latter. With the assumption that being closer to the query is better on each attribute, the object in FIG. 3 (star) is preferred over any objects in the shaded region in FIG. 3.

Figure 4:
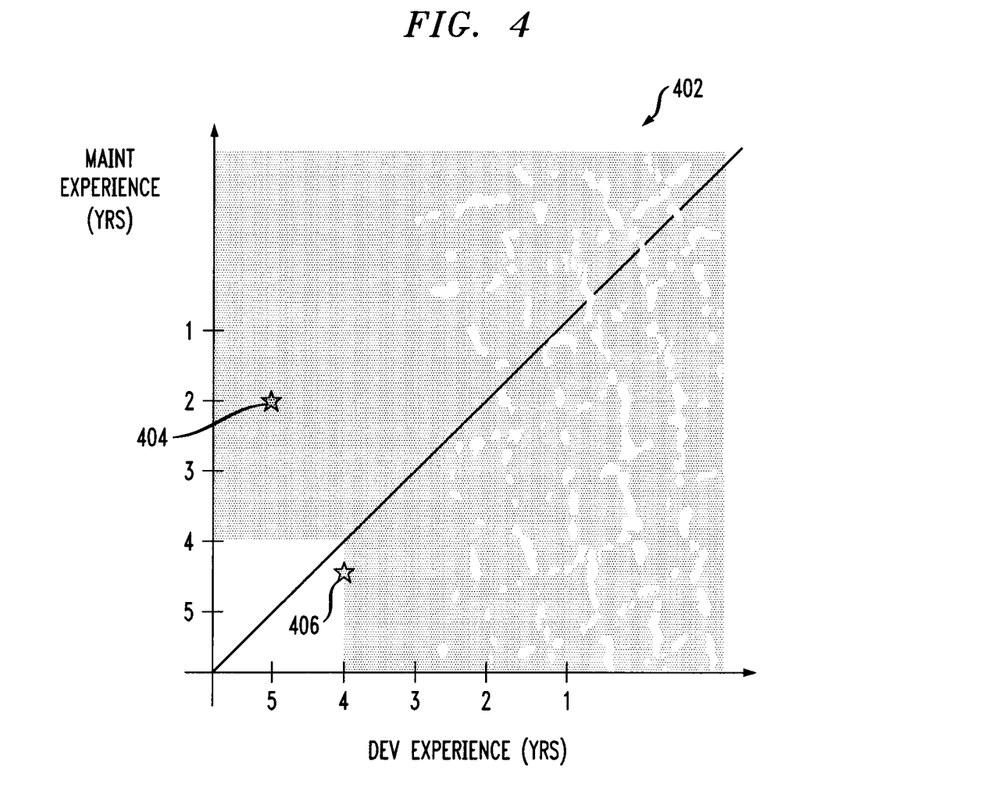
FIG. 4 is a graph illustrating an exemplary usage of an intersection operator (IO), according to an embodiment of the present invention.

FIG. 4 is a graph 402 illustrating an exemplary usage of an intersection operator (IO), according to an embodiment of the present invention. In graph 402 of FIG. 4, the query includes a hypothetical person who has maximum experience (10,10). Also, enterprise case indicates that both maintenance (Maint) and development (Dev) experience are required (hence, use the intersection operator). As depicted in graph 402, option 404 includes data points of 5 and 2, while option 406 includes data points of 4 and 4.5. Further, as indicated in FIG. 4, option 404 is less advantageous than option 406.

Being closer to the axis is better when each attribute is considered independently. Now, option 406 has a worst attribute value of 4 (the attribute values are 4 and 4.5—the worst is the smallest absolute value), whereas option 404 has a worst attribute of 2 (the smallest value among 5 and 2). Thus, option 404's worst attribute value (that is, 2) is worse than option 406's worst attribute value (that is, 4), thus making 406 more advantageous than 404.

Figure 5:
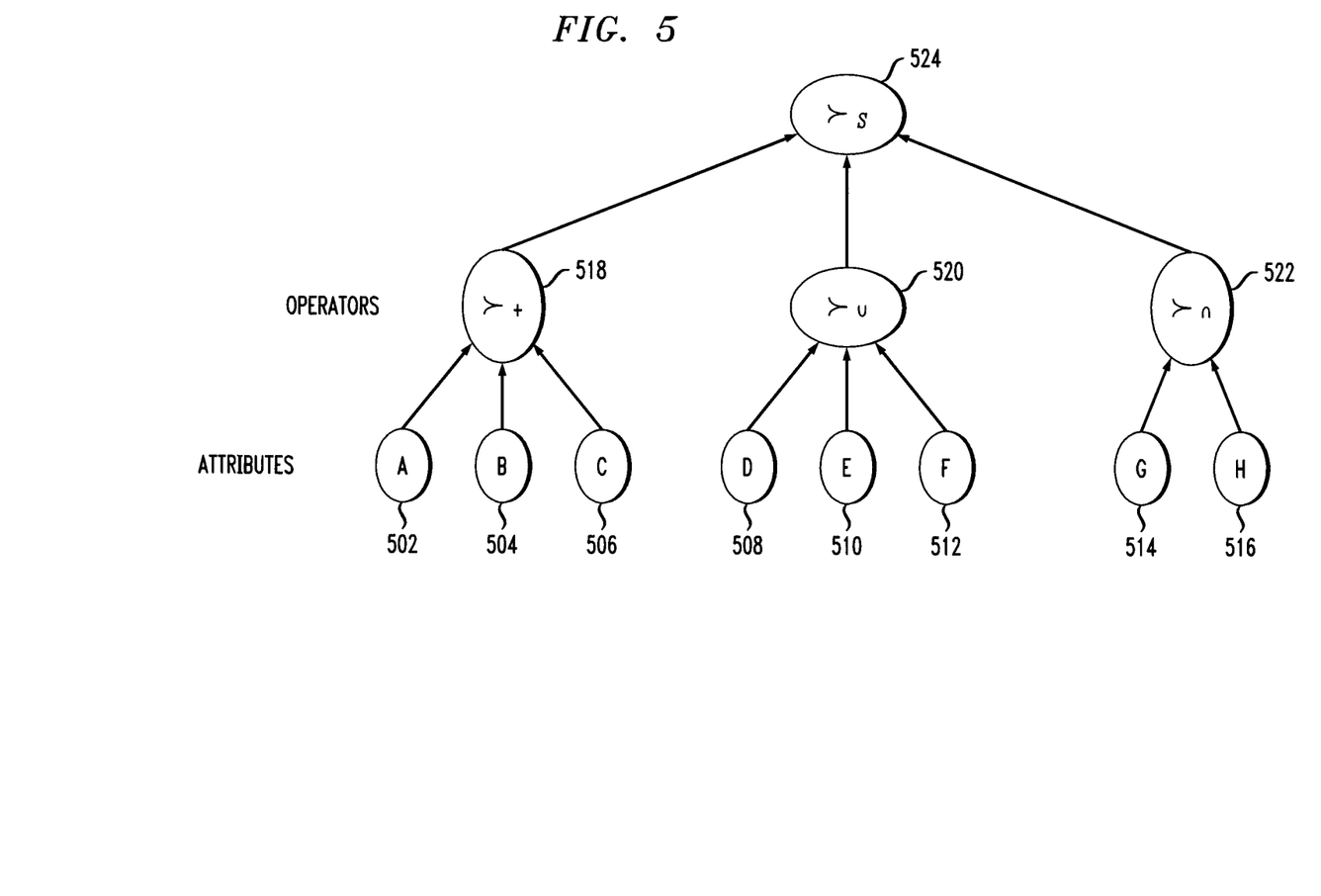
FIG. 5 is a diagram illustrating an exemplary tree, according to an embodiment of the present invention.

FIG. 5 is a diagram illustrating an exemplary tree, according to an embodiment of the present invention. By way of illustration, FIG. 5 depicts attribute A 502, attribute B 504, attribute C 506, attribute D 508, attribute E 510, attribute F 512, attribute G 514 and attribute H 516. Additionally, FIG. 5 depicts a G.Mean operator 518, a union operator 520, an intersection operator 522 and a skyline operator 524.

As illustrated in FIG. 5, attributes A 502, B 504 and C 506 are composed using the G.Mean operator 518. Attributes D 508, E 510 and F 512 are composed using the union operator 520. Also, attributes G 514 and H 516 are composed using the intersection operator 522. Further, the compositions are composed and/or combined using the skyline operator 524.

By way of example, attributes A, B and C may denote various skills in programming which can be composed using the G.Mean operator. Also, attributes D, E and F may denote skills in programming languages, of which the best can be taken (for example, for a project where different developers code in different languages). Additionally, attributes G and H may be development and maintenance experience which is composed using the intersection operator because both are essential. As these different groups are relatively independent of each other, they can be composed using the skyline operator, as illustrated in FIG. 5.

Figure 6:
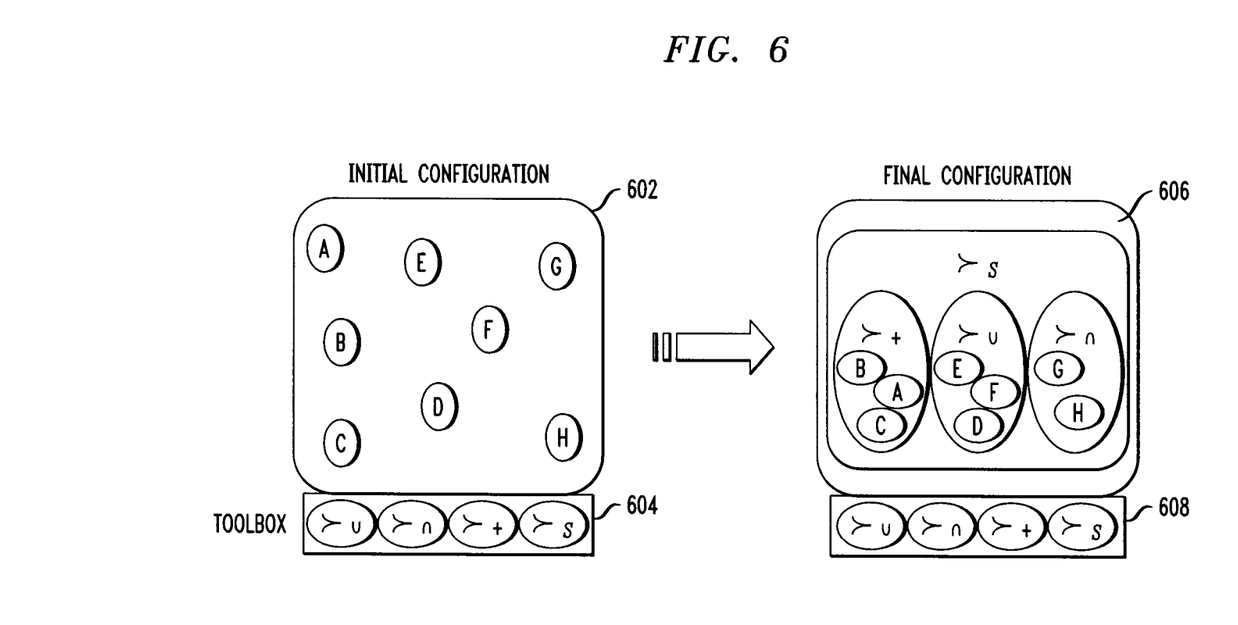
FIG. 6 is a diagram illustrating a system user interface (UI), according to an embodiment of the present invention.

FIG. 6 is a diagram illustrating a system user interface (UI), according to an embodiment of the present invention. By way of illustration, FIG. 6 depicts an initial configuration 602 that includes attributes A, B, C, D, E, F, G and H, as well as toolbox 604 that includes operators (such as, for example, a G.Mean operator, a union operator, an intersection operator and a skyline operator). Final configuration 606 includes the attributes grouped into groups via use of the operators from toolbox 608.

As illustrated by the example in FIG. 6, the techniques described herein enable a user to create an operator tree or some other representation that can capture dependency information. As such, in one or more embodiments of the invention, a user is provided with a user interface (UI) which enables the user to build an operator tree.

Input to an applicable algorithm can include the operator tree and a query. Additionally, one or more embodiments of the invention can include applying the operators bottom up to arrive at the final result on the root node. Each attribute can be associated with a list of database objects that are ordered in the increasing value of dissimilarity from the query value for that attribute. Also, each operator can take multiple lists as input, and output a single list that is the list of objects composed according to the semantics of the operator. Further, the root operator can output the list, which can be given to the user as the final list of results. In one or more embodiments of the invention, for example, the list may be truncated if the user has limited display area.

In contrast to the disadvantages of existing approaches that compose attributes using a single operator, the techniques detailed herein provide a flexible system for similarity retrieval where a user can express preferences (in terms of what attributes are compensatory, how they are compensatory, etc.), as well as obtain more relevant results because the system is able to process those preferences. As such, one or more embodiments of the invention include combining attributes using various similarity operators for use in a similarity search, and using such composite models for more effective similarity search.

Figure 7:
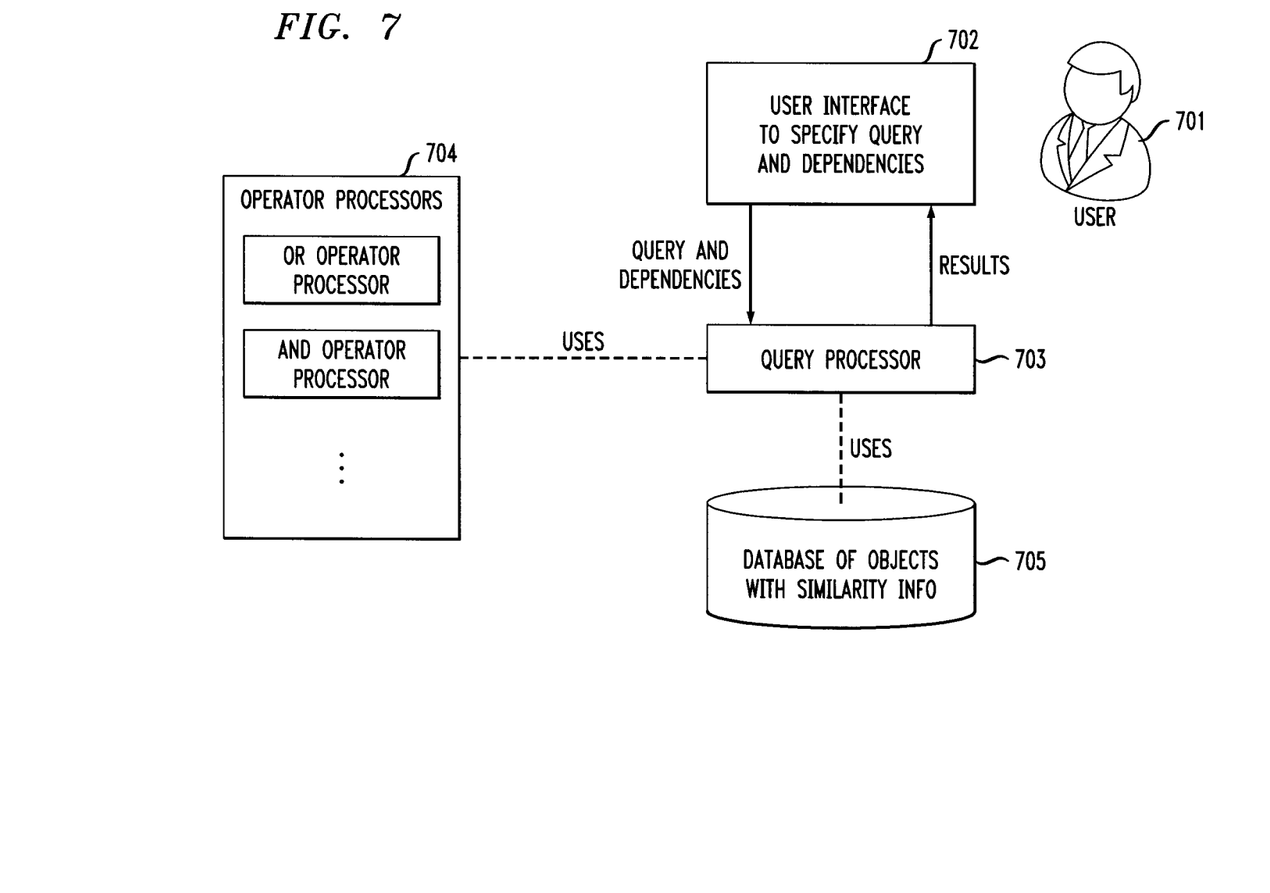
FIG. 7 is a block diagram illustrating an exemplary embodiment, according to an aspect of the invention.

FIG. 7 is a block diagram illustrating an exemplary embodiment, according to an aspect of the invention. By way of illustration, FIG. 7 depicts a user 701 who interacts with module 702, a user interface (UI) to specify the query and the dependency information. The query and dependency information are passed to a query processor module 703, which uses a database (of objects with similarity information) module 705 and an operator specific processing engines module 704 to compute the results according to the specified dependency information. The results can be passed back to the UI 702 which can display the results.

Figure 8:
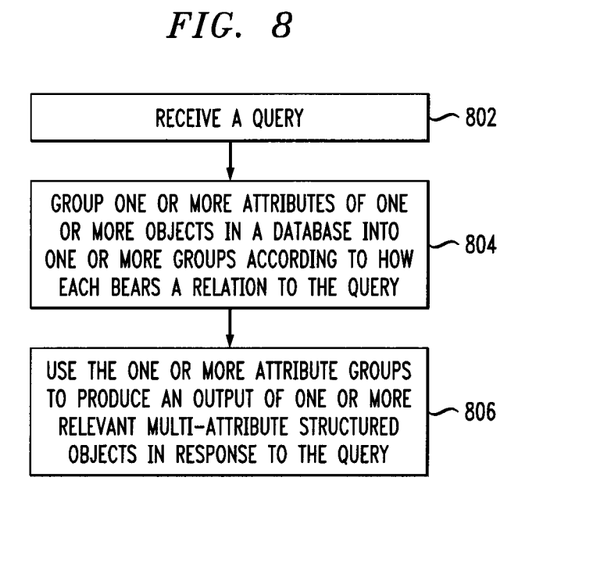
FIG. 8 is a flow diagram illustrating techniques for retrieval of one or more relevant multi-attribute structured objects with respect to a query, according to an embodiment of the invention.

FIG. 8 is a flow diagram illustrating techniques for retrieval of one or more relevant multi-attribute structured objects with respect to a query, according to an embodiment of the present invention. Step 802 includes receiving a query. A query can include, for example, an object similar in format to objects in the database. For example, a person who wants to sell his car could provide specifications of his car as a query and search for similar cars in a car-selling database with the possible intent of obtaining an estimate of the price that the car could fetch. Also, in one or more embodiments of the invention, some attributes can be left unspecified. By way of example, in searching for similar servers, the query could be a server object with some values for attributes unfilled (since all attribute values may not be always available).

Step 804 includes grouping one or more attributes of one or more objects in a database into one or more groups according to how each bears a relation to the query (for example, based on how each interacts with each of the other one or more attributes). Grouping attributes into groups can include, for example, using aggregation and skyline operators. Using aggregation and skyline operators can include catering interdependent and independent attributes of the objects.

Step 806 includes using the one or more attribute groups to produce an output (for example, a list) of one or more relevant multi-attribute structured objects in response to the query. Using the attribute groups to produce an output can include applying operators to the attribute groups from a bottom level up to arrive at a final output on a root node. Also, using the attribute groups to produce an output can include associating each attribute with a list of database objects that are ordered in an increasing value of dissimilarity from a query value for that attribute.

The techniques depicted in FIG. 8 can also include specifying how each of the groups would be combined while evaluating similarity. Additionally, one or more embodiments of the invention include providing a user interface, wherein the user interface enables a user to create an operator tree to capture dependency information.

One or more embodiments of the invention include providing a system that takes objects as queries, where the intent is to find other objects from the database which bear a relation to the query, keeping in view the dependencies specified. Additionally, the techniques detailed herein include providing a system that accepts objects which may not be fully specified (thus, could have certain attribute values unspecified).

The techniques depicted in FIG. 8 can also, as described herein, be run on a system, wherein the system includes distinct software modules, each of the distinct software modules being embodied on a tangible computer-readable recordable storage medium. The distinct software modules can include, for example a user interface module, a query processor module, a database module and an operator processing engine module executing on a hardware processor.

Additionally, the techniques depicted in FIG. 8 can be implemented via a computer program product that can include computer usable program code that is stored in a computer readable storage medium in a data processing system, and wherein the computer usable program code was downloaded over a network from a remote data processing system. Also, in one or more embodiments of the invention, the computer program product can include computer usable program code that is stored in a computer readable storage medium in a server data processing system, and wherein the computer usable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 9:
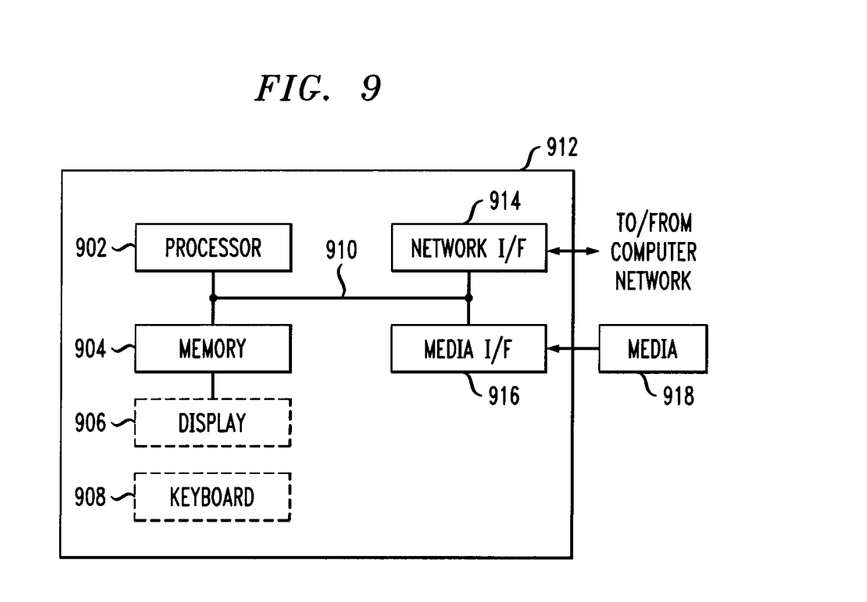
FIG. 9 is a system diagram of an exemplary computer system on which at least one embodiment of the invention can be implemented.

One or more embodiments can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 918) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 904), magnetic tape, a removable computer diskette (for example media 918), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may implement entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 7. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, combining attributes using various similarity operators for use in a similarity search.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for retrieval of one or more relevant multi-attribute structured objects with respect to a query, wherein the method comprises:
   receiving a user query for retrieval of one or more multi-attribute structured objects from a database that includes multiple objects with interdependent and independent attributes;
   receiving user instructions specifying how the interdependent and independent attributes are to be grouped in carrying out the query;
   grouping the attributes of the objects in the database into one or more groups according to the user instructions by:
      associating each of the attributes with a list of one or more database objects that are ordered in an increasing value of dissimilarity from a query value for the respective attribute;
      combining multiple aggregation operators in accordance with user-provided specifications, wherein the multiple aggregation operators comprise:
         (i) an intersection aggregation operator, wherein the intersection aggregation operator deems a first object as having a lower value of dissimilarity than a second object if the most dissimilar attribute of the first object has a higher absolute value than the most dissimilar attribute of the second object,
         (ii) a union aggregation operator, wherein the union aggregation operator deems a first object as having a lower value of dissimilarity than a second object if the least dissimilar attribute of the first object has a higher absolute value than the least dissimilar attribute of the second object,
         (iii) a generalized mean aggregation operator, and
         (iv) a Euclidean distance aggregation operator, to compose the interdependent attributes into multiple interdependent attribute compositions; and
      using a skyline operator to combine the multiple interdependent attribute compositions and the independent attributes into the one or more groups according to the user instructions; and
   using the one or more attribute groups to produce an output of a sorted list of one or more relevant multi-attribute structured objects from the database in response to the query that express preference specification of the one or more attributes.

2. The method of claim 1, wherein using the one or more attribute groups to produce an output comprises applying one or more operators to the one or more attribute groups from a bottom level up to arrive at a final output on a root node.

3. The method of claim 1, further comprising specifying how each of the one or more groups would be combined while evaluating similarity.

4. The method of claim 1, further comprising providing a user interface.

5. The method of claim 4, wherein the user interface enables a user to create an operator tree to capture dependency information.

6. The method of claim 1, wherein grouping the attributes into one or more groups comprises grouping the attributes into one or more groups according to how each interacts with each of the other attributes.

7. The method of claim 1, wherein the method is run on a system, wherein the system comprises one or more distinct software modules, each of the one or more distinct software modules being embodied on a tangible computer-readable recordable storage medium, and wherein the one or more distinct software modules comprise a user interface module, a query processor module, a database module and an operator processing engine module executing on a hardware processor.

8. A computer program product comprising a non-transitory tangible computer readable recordable storage medium including computer useable program code for retrieval of one or more relevant multi-attribute structured objects with respect to a query, the computer program product including:
   computer useable program code for receiving a user query for retrieval of one or more multi-attribute structured objects from a database that includes multiple objects with interdependent and independent attributes;
   computer useable program code for receiving user instructions specifying how the interdependent and independent attributes are to be grouped in carrying out the query;
   computer useable program code for grouping the attributes of the objects in the database into one or more groups according to the user instructions by:

associating each of the attributes with a list of one or more database objects that are ordered in an increasing value of dissimilarity from a query value for the respective attribute;

combining multiple aggregation operators in accordance with user-provided specifications, wherein the multiple aggregation operators comprise:

(i) an intersection aggregation operator, wherein the intersection aggregation operator deems a first object as having a lower value of dissimilarity than a second object if the most dissimilar attribute of the first object has a higher absolute value than the most dissimilar attribute of the second object, (ii) a union aggregation operator, wherein the union aggregation operator deems a first object as having a lower value of dissimilarity than a second object if the least dissimilar attribute of the first object has a higher absolute value than the least dissimilar attribute of the second object, (iii) a generalized mean aggregation operator, and (iv) a Euclidean distance aggregation operator, to compose the interdependent attributes into multiple interdependent attribute compositions; and using a skyline operator to combine the multiple interdependent attribute compositions and the independent attributes into the one or more groups according to the user instructions; and computer useable program code for using the one or more attribute groups to produce an output of a sorted list of one or more relevant multi-attribute structured objects from the database in response to the query that express preference specification of the one or more attributes.

9. The computer program product of claim 8, further comprising:

computer useable program code for specifying how each of the one or more groups would be combined while evaluating similarity.

10. The computer program product of claim 8, further comprising:

computer useable program code for providing a user interface, wherein the computer useable program code for providing a user interface further comprises computer useable program code for enabling a user to create an operator tree to capture dependency information.

11. The computer program product of claim 8, wherein the computer usable program code comprises one or more distinct software modules, and wherein the one or more distinct software modules comprise a user interface module, a query processor module, a database module and an operator processing engine module executing on a hardware processor.

12. A system for retrieval of one or more relevant multi-attribute structured objects with respect to a query, comprising:

a memory; and at least one processor coupled to the memory and operative to:

receive a user query for retrieval of one or more multi-attribute structured objects from a database that includes multiple objects with interdependent and independent attributes;

receive user instructions specifying how the interdependent and independent attributes are to be grouped in carrying out the query;

group the attributes of the objects in the database into one or more groups according to the user instructions by:

associating each of the attributes with a list of one or more database objects that are ordered in an increasing value of dissimilarity from a query value for the respective attribute;

combining multiple aggregation operators in accordance with user-provided specifications, wherein the multiple aggregation operators comprise:

(i) an intersection aggregation operator, wherein the intersection aggregation operator deems a first object as having a lower value of dissimilarity than a second object if the most dissimilar attribute of the first object has a higher absolute value than the most dissimilar attribute of the second object, (ii) a union aggregation operator, wherein the union aggregation operator deems a first object as having a lower value of dissimilarity than a second object if the least dissimilar attribute of the first object has a higher absolute value than the least dissimilar attribute of the second object, (iii) a generalized mean aggregation operator, and (iv) a Euclidean distance aggregation operator, to compose the interdependent attributes into multiple interdependent attribute compositions; and using a skyline operator to combine the multiple interdependent attribute compositions and the independent attributes into the one or more groups according to the user instructions; and use the one or more attribute groups to produce an output of a sorted list of one or more relevant multi-attribute structured objects from the database in response to the query that express preference specification of the one or more attributes.

13. The system of claim 12, wherein the at least one processor coupled to the memory is further operative to:

specify how each of the one or more groups would be combined while evaluating similarity.

14. The system of claim 12, wherein the at least one processor coupled to the memory is further operative to:

provide a user interface, wherein the user interface enables a user to create an operator tree to capture dependency information.

15. The system of claim 12, further comprising a tangible computer-readable recordable storage medium having one or more distinct software modules embodied thereon, the one or more distinct software modules comprising a user interface module, a query processor module, a database module and an operator processing engine module executing on a hardware processor.

* * * * *